United States Patent [19]

Clouet

[11] Patent Number: 5,189,112

[45] Date of Patent: Feb. 23, 1993

[54] POLYMERS HAVING PENDANT THIURAM DISULPHIDE FUNCTIONS

[75] Inventor: Gilbert Clouet, La Wantzenau, France

[73] Assignee: Elf Atochem S.A., Paris La Defense, France

[21] Appl. No.: 687,793

[22] Filed: Apr. 19, 1991

Related U.S. Application Data

[63] Continuation-in-part of Ser. No. 599,805, Oct. 19, 1990, abandoned.

[30] Foreign Application Priority Data

Oct. 19, 1989 [FR] France ............... 89 13706

[51] Int. Cl.$^5$ .................. C08F 20/00; C08F 26/00
[52] U.S. Cl. ................... 525/328.2; 526/288
[58] Field of Search ........................ 525/328.2

[56] References Cited

U.S. PATENT DOCUMENTS 4,239,865 12/1980 Tarao .

FOREIGN PATENT DOCUMENTS 0416547 3/1991 European Pat. Off. .

OTHER PUBLICATIONS

Nair et al., "Functionalization of PMMA by a functional 'Iniferter', etc." Journal of Polymer Science, vol. 27, No. 6, pp. 1795–1800, May 1989.
Nair et al., "Triblock Copolymers Vai Thermal 'macroiniferters', etc." Makromol. Chem. 192, 579–590 (1991).

Primary Examiner—Christopher Henderson
Attorney, Agent, or Firm—Millen, White, Zelano and Branigan

[57] ABSTRACT

Polymers containing repeating units of:

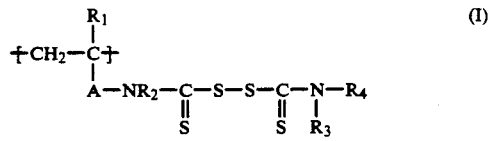

and optionally random distribution of other units derived from at least one vinyl monomer, $R_1$ is H; alkyl, cycloalkyl or aryl each of which is unsubstituted or substituted by at least one halogen;

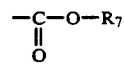

($R_7$ is H, alkyl, cycloalkyl or aryl); A is a single bond; alkylene, cycloalkylene or arylene; or

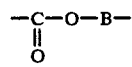

(B is alkylene, cycloalkylene or arylene); $R_2$, $R_3$ and $R_4$ are alkyl, cycloalkyl or aryl; it being possible for at least one of $R_3$ and $R_4$ to contain at least one hydroxyl or carboxylic acid groups or to represent a polyoxyethylene or polyester sequence.

These polymers are useful for the preparation of graft copolymers containing the units of the formula:

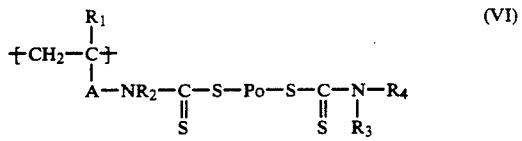

where Po is a vinyl or a diene polymer sequence, and other vinyl units. These graft copolymers are useful especially as compatibility agents.

24 Claims, No Drawings

POLYMERS HAVING PENDANT THIURAM DISULPHIDE FUNCTIONS

CROSS-REFERENCE TO RELATED APPLICATION

This application is a continuation-in-part of Application Ser. No. 07/599,805, filed Oct. 19, 1990, now abandoned.

BACKGROUND OF THE INVENTION

The present invention relates to homopolymers and copolymers having pendant thiuram disulphide functions, to a process for the preparation of these polymers, and to their use as agents having the triple function of initiator, chain transfer agent and terminating agent (designated by the abbreviation "iniferters") in freeradical polymerization of vinyl and diene monomers leading to graft copolymers.

SUMMARY OF THE INVENTION

The present invention first relates to polymers comprising or consisting essentially of a chain linkage of units:

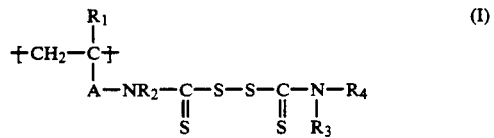

it being possible for this chain linkage to comprise in random distribution other units derived from at least one vinylic monomer, where:

$R_1$ represents a hydrogen atom or a monovalent organic radical selected from: an alkyl, cycloalkyl or aryl radical or a combination of at least two of these radicals; a

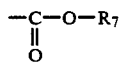

radical, where $R_7$ represents hydrogen, an alkyl, cycloalkyl or aryl radical or a combination of at least two of these radicals; or an alkyl, cycloalkyl or aryl radical or a combination of at least two of them substituted by at least one halogen atom, for example a 3,3,3-trifluoropropyl radical;

A represents a single bond; an alkylene, cycloalkylene or arylene radical or a combination of at least two of these radicals; or a

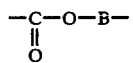

radical, where B represents an alkylene, cycloalkylene or arylene radical or a combination of at least two of these radicals;

$R_2$, $R_3$ and $R_4$ each represent independently an alkyl, cycloalkyl or aryl radical or a combination of at least two of these radicals; it being also possible for at least one of $R_3$ and $R_4$ to contain at least one hydroxyl or carboxylic acid group or represent a polyoxyethylene or polyester sequence derived from a polyoxyethylene or a polyester terminated by a hydroxyl function, respectively;

it being possible for the alkyl, cycloalkyl, aryl radicals or their combinations, the alkylene, cycloalkylene, arylene radicals or their combinations which are covered by the definitions given above to contain at least one heteroatom, such as O or S, and/or at least one

radical, where R represents alkyl, cycloalkyl or aryl or a combination of at least two of these radicals.

Other suitable vinylic units are units of the formula:

where $R_5$ and $R_6$ represent hydrogen, an alkyl, cycloalkyl or aryl radical or a combination of at least two of these radicals; an alkyl, cycloalkyl or aryl radical or a combination of at least two of these radicals substituted by at least one halogen atom; a radical —C≡N;

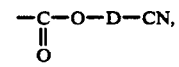

where D is alkylene, cycloalkylene, arylene or a combination of at least two of these radicals;

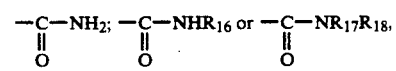

where $R_{16}$, $R_{17}$ and $R_{18}$ represent an alkyl, cycloalkyl or aryl radical or a combination of at least two of these radicals; or a pyridine radical; with the proviso that $R_5$ and $R_6$ never represent hydrogen simultaneously.

Units derived from maleic anhydride and maleimides substituted on the nitrogen by an alkyl, cycloalkyl or aryl radical are also suitable.

The molecular weights of these random copolymers and homopolymers are in particular between 500 and 2,000,000. The proportion of unit (I) can vary within wide limits, since at least one unit (I) can be present per copolymer chain.

The alkyl groups covered by the above definitions are especially $C_1$–$C_{12}$-, in particular $C_1$–$C_6$-alkyl groups are especially $C_3$–$C_{12}$-, in particular $C_1$–$C_7$-cycloalkyl groups; and the aryl groups are, for example, phenyl or naphthyl groups. Furthermore, the definition of a group as an alkyl, cycloalkyl or aryl radical or an alkylene, cycloalkylene or arylene radical likewise includes the combination of at least two of these radicals, for example, an aralkyl, alkaryl radical etc.

The polyalkylene sequence covered by the definition of $R_3$ or $R_4$ can be derived from the following polyoxyalkylenes without the terminal OH function:

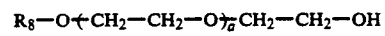

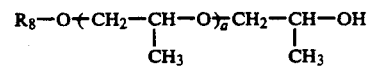

-continued

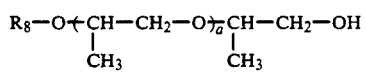

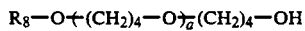

where:

$R_8$ represents an alkyl, cycloalkyl or aryl radical; or a combination of at least two of these radicals, and
a denotes 1 to 1,000, preferably 1 to 200.

The polyester sequence covered by the definition of $R_5$ can be derived from the following polyesters without the terminal OH function:

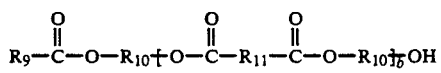

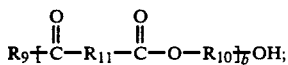

and

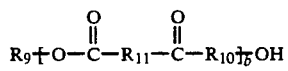

where:

$R_9$ is as defined above for $R_8$;

$R_{10}$ and $R_{11}$ each independently represent an alkylene, cycloalkylene, arylene, alkenylene, arylene radical substituted by alkenyl, it being possible for these radicals to contain at least one heteroatom and/or at least one

radical, where $R_{12}$ is chosen from alkyl, cycloalkyl and aryl groups and can contain substituents; and
b denotes 1 to 300, preferably 1 to 50.

Examples of suitable radicals $R_{10}$ and $R_{11}$ containing at least one unsaturation are the radicals:

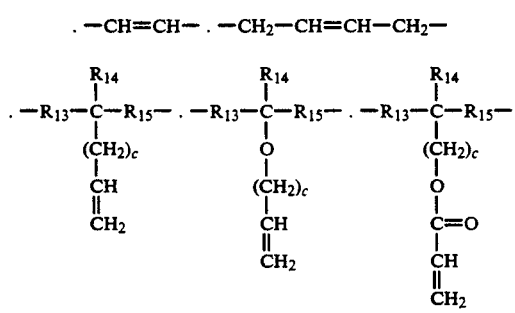

where c denotes 1 to 12;

$R_{13}$ and $R_{15}$ each independently represent a single bond, an alkylene, cycloalkylene or arylene radical or a combination of at least two of these radicals;

$R_{14}$ represents hydrogen, alkyl, cycloalkyl or aryl or a combination of at least two of these radicals;

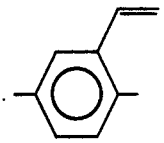

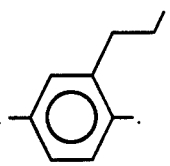

The present invention also relates to a process for the preparation of these polymers, which is characterized in that:

in a first step, the polymerization of at least one monomer of the formula:

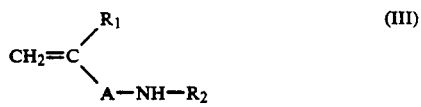

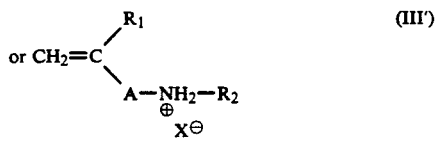

in which X represents a counterion, such as a halide or an acid radical, such as $HSO_3^\ominus$, and, if desired, of at least one vinylic comonomer is carried out, in a second step, the polymer obtained and comprising the units:

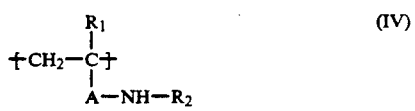

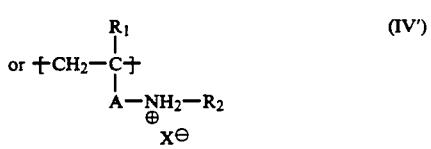

and, where appropriate, units derived from the comonomer(s), is reacted in the presence of at least one oxidizing agent with carbon disulphide and a compound of the formula:

$$R_3-NH-R_4 \quad (V)$$

$$\text{or } R_3-\underset{\oplus}{NH_2}-R_4 \quad (V')$$
$$X^\ominus$$

Suitable monomers of the formula (III) are, inter alia, N-t-butylaminoethyl methacrylate, N-1-butylaminoethyl methacrylate, N-ethylaminoethyl methacrylate, N-methylaminoethyl methacrylate and the corresponding acrylates.

Suitable comonomers are, inter alia, alkyl methacrylates, and acrylates, in which the alkyl group contains, for example, 1 to 8 carbon atoms, vinyl aromatic hydrocarbons, unsaturated nitriles, cyanoethyl acrylates, acrylamide, lower hydroxyalkyl acrylates and methacrylates, acrylic acid and methacrylic acid, maleic anhydride and maleimides substituted by alkyl or aryl groups. Particularly suitable comonomers are methyl methacrylate, ethyl methacrylate, isopropyl methacrylate, n-butyl methacrylate, n-hexyl methacrylate, 2-ethylhexyl methacrylate, isobutyl methacrylate and tert-butyl methacrylate, styrene, alpha-methylstyrene, monochlorostyrene, tert-butylstyrene, vinyltoluene, 2-vinylpyridine and 4-vinylpyridine and the like.

Examples of suitable compounds of the formula (V) are diethylamine, dimethylamine, N-ethyl-N-methylamine, N-methyl-N-propylamine, N-ethyl-N-propylamine, dipropylamine, di-isopropylamine, cyclopentylamine.

Preferred embodiments of the two steps of this process will now be described.

First Step

The polymerization is carried out either as bulk, suspension, emulsion or solution polymerization at a temperature between, for example, about 30° and 150° C. The solvent is selected from those capable of solubilizing the polymer chain, for example, tetrahydrofuran, toluene, ethanol and mixtures thereof.

The initiator is selected from compounds generating free radicals, such as peroxides, azo compounds, peracids, redox systems. The polymerization can be effected by photochemistry or radiochemistry.

Second Step

In accordance with the preferred embodiments, an equimolar amount of $CS_2$ with respect to the overall number of secondary amine groups is used: those carried by units (IV) and (IV') of the polymer of the last step, plus those carried by the compound of the formula (V) or (V'), the latter being used in a large molar excess with respect to (IV) or (IV'), it being possible for the reaction to be carried out in the presence of a tertiary amine (for example triethylamine or pyridine), in an amount of about 1 mol per mole of compound (III) or in an amount of about 2 mol per mol of compound (III'). The oxidizing agent is added, for example, in an amount of about 1 mole per mole of $CS_2$. It can be selected from, inter alia, iodine, hydrogen peroxide, hypochlorites of alkali metals and alkyl and aryl hydroperoxides, and potassium hexacyanoferrate.

The reaction can be carried out in a solvent, for example in water, alcohol or a water/alcohol mixture, it also being possible for $CS_2$ or the tertiary amine to function as the solvent. The reaction is in general carried out at a temperature between about $-20°$ C. and ambient temperature.

The present invention also relates to graft copolymers whose grafts contain vinyl or diene sequences, these copolymers comprising a chain linkage of units:

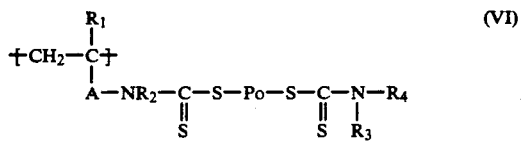

(VI)

where Po represents a vinyl or a diene polymer sequence, it being possible for this chain linkage to contain a random distribution of units derived from at least one other vinyl monomer.

The molecular weights of the Po sequence are in general between about 100 and 1,000,000 and preferably about 1,000 and 100,000.

The invention also relates to a process for the preparation of these graft copolymers, which is characterized in that the polymerization of a vinyl or diene monomer is carried out at a temperature of about 50° to 160° C. in the presence of an "iniferter" polymer, such as defined above, the latter being preferably introduced at the beginning of the polymerization together with the monomers.

The amount of "iniferter" polymer introduced is in general between $10^{-5}$ and 0.5 mole/l, relative the vinyl or diene monomers.

Suitable vinyl monomers are those mentioned above. Suitable diene monomers are, inter alia, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, the 2-alkyl-2,5-norbornadienes, 5-ethylidene-2-norbornene,5(2-propenyl)-2-norbornene, 5(5-hexenyl)-2-norbornene, 1,5-cyclooctadiene, bicyclo[2.2.2]octa-2,5-diene, cyclopentadiene, 4,7,8,9-tetrahydroindene and isopropylidenyltetrahydroindene.

These graft copolymers can serve to render a mixture of homopolymers PA and PB compatible with one another, in which case the chemical nature of the $P_o$ sequence is the same as that of, for example, PA, while the nature of the monomer B is the same as that of the comonomer which was used to synthesize the polymer of the invention.

The examples which follow illustrate the present invention, without, however, limiting its scope.

EXAMPLES 1 TO 6

Free-radical copolymerization of methyl methacrylate (MMA) with N-t-butylaminoethyl methacrylate (BaeM) (Ex. 1 to 3) and n-butyl methacrylate (MMB) with BaeM (Ex. 4 to 6).

GENERAL PROCEDURE

The copolymerization were carried out as bulk or solution polymerization in benzene, tetrahydrofuran (THF) or dimethylformamide (DMF) at a concentration of the order of 2 mol/l of monomer and an initiator concentration (azo or peroxide compound) of the order of $2 \times 10^{-3}$ mol/l. The copolymerizations are carried out, protected against light, in flasks equipped with a stirrer and sealed under vacuum or maintained under an inert gas ($N_2$, argon) after introduction of the reactants. The polymerization is carried out by immersing the flask into an oil bath with temperature control at the required temperature and over the period desired. After the copolymerization, the flask is removed and cooled in an isopropanol/dry ice mixture. The polymer is diluted in toluene, THF or any other solvent, and is then precipitated by dropwise addition to heptane or methanol. The precipitate or resinous product obtained is collected in a sintered glass crucible, washed with heptane or methanol, dried at 45° C. under a vacuum to constant weight (for 12 to 24 hours).

Polymerization reactions carried out at 60° C.±5° C. at polymerization times between 45 and 90 minutes in toluene solution

| Ex. | Monomers M1 | M2 | Molar fraction of M2 in the reaction mixture | Mn × 10⁻⁴ | I[a] | Molar fraction of M2 in the copolymer |
|---|---|---|---|---|---|---|
| 1 | MMA | BaeM | 0.1 | 9.6 | 1.36 | 0.101 |
| 2 | MMA | " | 0.4 | 10.9 | 1.53 | 0.41 |
| 3 | " | " | 0.7 | 11.5 | 1.58 | 0.695 |
| 4 | MMB | BaeM | 0.1 | 18.4 | 1.97 | 0.23 |
| 5 | " | " | 0.25 | 10.3 | 2.85 | 0.50 |
| 6 | " | " | 0.55 | 6.4 | 3.20 | 0.83 |

[a]I = polydispersity index

EXAMPLES 7a and 7b

Synthesis of "polyiniferters" having pendant thiuram groups

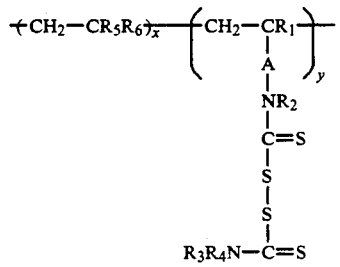

EXAMPLE 7a 15 g (1.56×10⁻⁴ mole) of the copolymer of Example 1 (containing 1.56×10⁻⁵ mole of secondary amine) are dissolved in 150 ml of toluene to which 1 ml (1.56×10⁻² mole) of $CS_2$, and then 1.14 g (1.56×10⁻² mole) of diethylamine are added. 2 g (1.56×10⁻² mole) of iodine dissolved in 50 ml of toluene are then added to the reaction mixture which is maintained at 20° C. with stirring.

The mixture is stirred until the iodine has completely disappeared. It is then poured into a methanol/water mixture. The precipitate is redissolved in toluene, dried and recovered by evaporation of the solvent under partial vacuum.

EXAMPLE 7b 4.34 g (6.78×10⁻⁵ mole) of the copolymer of Example 6 containing (1.56×10⁻⁵ mole) of secondary amine are treated in the same manner as in Example 7a.

EXAMPLES 8 to 15

Synthesis of graft copolymers

Free-radical polymerization of a vinyl monomer: styrene (Ex. 8 to 11) and hydroxyethyl methacrylate (HEMA) (Ex. 12 to 15) from the graft "polyiniferters" of Examples 7a and 7b.

GENERAL PROCEDURE

The polymerization are carried out in flasks (or tubes) equipped with a stirrer and, after introduction of the reactants, sealed under a vacuum or maintained under an inert gas ($N_2$, argon). (The graft "polyiniferters" obtained in Examples 7a and 7b are dissolved in toluene). The polymerizations are carried out by immersing the flasks in an oil bath with temperature control at the required temperature over the desired period. At the end of the polymerization, the flask is removed from the oil bath, cooled in an isopropanol/dry ice mixture, and the graft copolymer is poured dropwise in heptane or methanol, depending on the graft copolymer. The soluble fraction is redissolved in toluene (or methanol in the case of HEMA as graft comonomer) and reprecipitated in adequate nonsolvents.

The graft copolymer is then dried at 45° C. to constant weight (24 to 48 hours).

Various polymerizations of styrene (Examples 8 to 11) and HEMA (Examples 12 to 15) were carried out by varying the concentration of the "graft polyiniferter" in gram per liter of monomer, the temperature and the duration of polymerization with the compounds obtained by Examples 7a and 7b.

The graft copolymer is characterized by its weight average molecular weight (Mw) and its percentage by weight of graft comonomer.

| Ex. | GPI Type | GPI Conc. in g/l | Duration of polym. °C. | Duration of polym. t(h) | Percentage by weight of graft monomer |
|---|---|---|---|---|---|
| 8 | 7a | 400 | 70 | 36 | 73 |
| 9 | 7a | 200 | 80 | 24 | 36 |
| 10 | 7b | 300 | 70 | 36 | 50 |
| 11 | 7b | 100 | 80 | 24 | 80 |
| 12 | 7a | 100 | 85 | 17 | 40 |
| 13 | 7a | 100 | 85 | 26 | 61 |
| 14 | 7b | 100 | 85 | 20 | 67 |
| 15 | 7b | 100 | 85 | 33 | 80 |

GPI: "graft polyiniferter" of Example 7a or 7b

All the polymers mentioned above, aside from the previously recited utilities, can be used as coating materials, be fabricated into shaped objects, etc., by conventional processes, e.g., molding.

The entire disclosures of all applications, patents and publications cited above and of corresponding application Ser. No. 599,805 filed Oct. 19, 1990, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A polymer comprising a chain linkage comprising repeated units of:

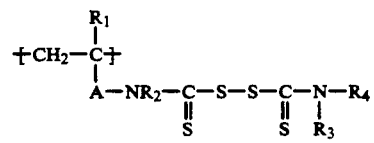

wherein:

$R_1$ represents a hydrogen atom or a monovalent organic radical which is an alkyl, cycloalkyl or aryl radical or a combination of at least two of the aforesaid radicals; a

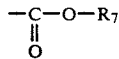

radical, where $R_7$ represents hydrogen, an alkyl, cycloalkyl or aryl radical or a combination of at least two of the aforesaid radicals; or a radical substituted by at least one halogen atom, said radical being an alkyl, cycloalkyl or aryl radical or a combination of at least two of the aforesaid radicals;

represents a single bond; an alkylene, cycloalkylene or arylene radical or a combination of at least two or the aforesaid radicals; or a

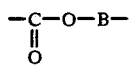

radical, where B represents an alkylene, cycloalkylene or arylene radical or a combination of at least two of the aforesaid radicals;

$R_2$, $R_3$ and $R_4$ each represent independently an unsubstituted alkyl, cycloalkyl or aryl radical or a combination of at least two of the aforesaid radicals or at least one of $R_3$ and $R_4$ is substituted by at least one hydroxyl or carboxylic acid group, or at least one of $R_3$ and $R_4$ represents a polyoxyethylene or polyester sequence derived from a polyoxyethylene or a polyester terminated by a hydroxyl function, respectively;

all of said alkyl, cycloalkyl, aryl radicals and their combinations, alkylene, cycloalkylene, arylene radicals and their combinations optionally containing at least one heteroatom, and/or at least one

radical, where R represents alkyl, cycloalkyl or aryl radicals or a combination of at least two of said radicals.

2. A polymer according to claim 1, further comprising in random distribution other units derived from at least one vinylic monomer.

3. A polymer according to claim 1, having a molecular weight between 500 and 2,000,000.

4. A polymer according to claim 1, wherein A represents ethylene.

5. A polymer according to claim 1, wherein $R_1$ represents ethyl.

6. A polymer according to claim 4, wherein $R_1$ represents ethyl.

7. A polymer according to claim 1, wherein $R_2$ is tertiary butyl.

8. A polymer according to claim 4, wherein $R_2$ is tertiary butyl.

9. A polymer according to claim 5, wherein $R_2$ is tertiary butyl.

10. A polymer according to claim 6, wherein $R_2$ is tertiary butyl.

11. A polymer according to claim 1, wherein both $R_3$ and $R_4$ represent ethyl.

12. A polymer according to claim 4, wherein both $R_3$ and $R_4$ represent ethyl.

13. A polymer according to claim 5, wherein both $R_3$ and $R_4$ represent ethyl.

14. A polymer according to claim 6, wherein both $R_3$ and $R_4$ represent ethyl.

15. A polymer according to claim 7, wherein both $R_3$ and $R_4$ represent ethyl.

16. A polymer according to claim 8, wherein both $R_3$ and $R_4$ represent ethyl.

17. A polymer according to claim 9, wherein both $R_3$ and $R_4$ represent ethyl.

18. A polymer according to claim 10, wherein both $R_3$ and $R_4$ represent ethyl.

19. A polymer according to claim 1 containing neither said heteroatom or nor said

radical.

20. A polymer according to claim 1 containing none of said combinations.

21. A polymer according to claim 19 containing none of said combinations.

22. A polymer according to claim 21, wherein $R_3$ and $R_4$ are said unsubstituted radicals.

23. A polymer according to claim 21, wherein at least one of $R_3$ and $R_4$ is substituted by hydroxy.

24. A polymer according to claim 21, wherein at least one of $R_3$ and $R_4$ represents a polyoxyethylene sequence derived from a polyoxyethylene terminated by a hydroxyl function.

* * * * *